Aug. 30, 1932.  C. ANDREWS  1,874,411
STRAINER
Filed June 26, 1931

Inventor.
Charles Andrews
By Wilson, Dowell, McCanna & Rehm
Attys.

Patented Aug. 30, 1932

1,874,411

UNITED STATES PATENT OFFICE

CHARLES ANDREWS, OF ROCKFORD, ILLINOIS, ASSIGNOR TO THE WASHBURN COMPANY, OF WORCESTER, MASSACHUSETTS, A CORPORATION OF MASSACHUSETTS

STRAINER

Application filed June 26, 1931. Serial No. 546,934.

This invention relates to strainers, and is particularly concerned with an improved strainer for a food press and ricer.

The principal object of my invention is to provide such a utensil adapted for a variety of purposes in the preparation of food, and of sturdy, durable and economical construction, besides being adapted to be taken apart quickly and easily to facilitate cleaning, and so as also to permit of the substitution of a bowl of one mesh screen for another bowl to meet any requirement.

The salient feature of this utensil lies in the fact that the screen bowl or hopper is suspended in elevated relation to the supporting frame arranged to be placed on the plate or dish into which the food is to be strained or pressed, thus permitting the use of the press directly on any shallow dish from which the food is to be later served, and making it unnecessary to use a deeper bowl in the use of the press and thereafter transfer the food from the bowl to the serving dish. This means a saving in time, and the handling and dirtying of less dishes. Furthermore, the bowl is always supported clear of the food in the dish so that no time is wasted in clearing food from under the bowl.

The invention is illustrated in the accompanying drawing, in which—

Figure 1:
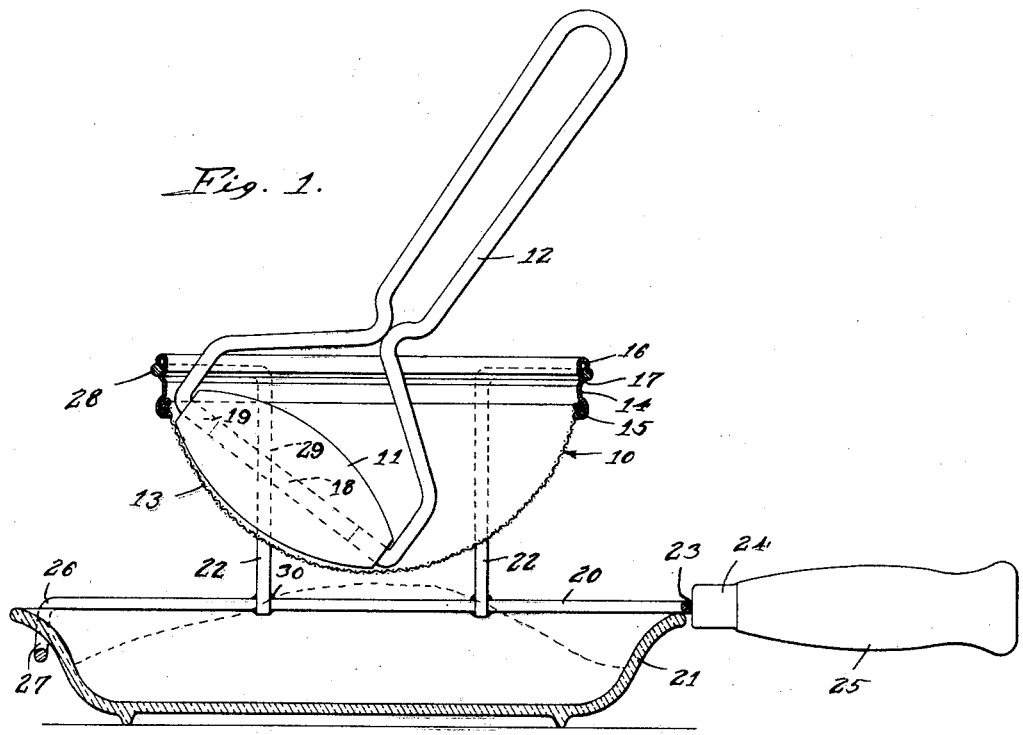
Figure 2:
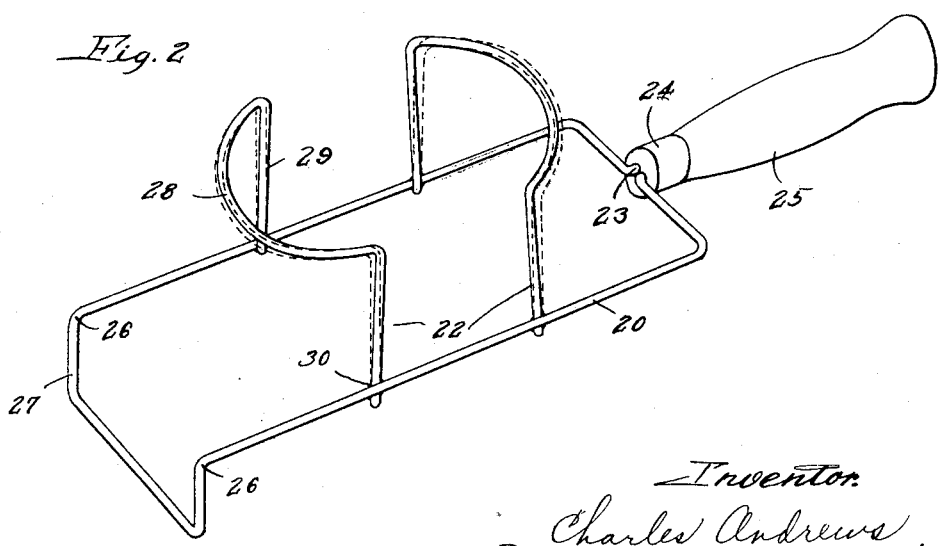

Figure 1 is a longitudinal vertical section through the utensil of my invention indicating how the same is adapted to rest on the rim of a bowl or other dish during use, and Fig. 2 is a perspective view of the supporting frame.

The same reference numerals are applied to corresponding parts in the two views.

This utensil, in accordance with the disclosure in my copending application, Serial No. 474,231, filed August 9, 1930, comprises a screen bowl or hopper 10 in connection with which a roller or food extractor 11 carried on a handle 12 is arranged to be used. The bowl 10, in accordance with said application, has a screen body 13 of substantially semi-spherical form held in a circular sheet metal frame 14 by the crimping of the lower edge of said frame thereon in the usual manner, as at 15. The upper edge of the frame 14 is rolled so as to provide an outwardly projecting rim 16, and slightly below this rim an annular, outwardly projecting bead 17 is provided. The form of the frame 14 is taken advantage of for the detachable mounting thereof in holders on the supporting frame, as will soon appear. The roller 11, in accordance with the other application, is of elongated substantially ellipsoidal form, round in cross-section, and conformed peripherally from end to end thereof to fit the semi-spherical inside curvature 13 of the bowl, whereby to roll therein on the natural arc thereof. An axial hole 18 is drilled through the roller 11 for reception of the trunnions 19 formed on the handle 12, on which the roller is, of course, mounted for rotation. The roller 11 is arranged to be rolled about in the bowl by means of the handle 12, and at the same time have pressure exerted thereon sufficient to press the food through the screen. The extracting and straining functions of the utensil are thought to be self-evident; the juice or other substance is arranged to pass through the screen, leaving the skins and seeds in the bowl. The rolling of the roller on the inside of the screen bowl results in the pressing out and extraction of the last vestige of food or juice so that there is a minimum amount of waste. A number of bowls having screens of different meshes are preferably provided with each utensil so as to meet any requirement.

In accordance with the present invention, I provide a supporting frame 20 arranged to rest on the dish or plate 21 adapted to receive the food discharged from the press, and having holders 22 for the bowl 10 projecting upwardly therefrom for suspension of the bowl in elevated relation to the supporting frame. The supporting frame 20 is preferably of elongated rectangular form, large enough to span the average sized dish or plate, and is made from a single piece of wire, the free ends 23 of which are projected outwardly from the middle of one end of the frame through the metal ferrule 24 on the end of the handle 25. The ends of the wire are driven into the handle far enough to insure a permanent connection, and so as to bring the ferrule 24 up so close to the end of the frame that it is impossible for it to loosen and come off the end of the handle. The opposite end of the frame 20 is bent downwardly, as indicated at 26, to form a yoke 27 into which the rim of the dish or plate is arranged to fit, as indicated in Figure 1. In other words, the frame is hooked onto the rim of the dish so that it will not slide back and forth during the operation of the press. The holders 22 are each bent from a single piece of wire to form complemental arcuate portions 28, which together approximate a circle for reception of the frame 14 of the bowl 10, and are furthermore each bent downwardly at right angles to the plane of the arcuate portions 28 to provide supporting legs 29, the lower ends of which are welded or otherwise suitably secured to the sides of the frame 20, preferably on the inside thereof, as at 30. The holders 22 are spaced so that the arcuate portions 28 normally occupy a position within concentricity. Then, as the bowl 10 is pressed into place between the holders, the holders are flexed outwardly to a certain extent, as indicated in dotted lines in Fig. 2, the arcuate portions 28 being thus spread to a position beyond concentricity. Finally, after the bead 17 of the frame 14 of the bowl is forced past the arcuate portions 28 of the holders, the latter snap into place between the bead 17 and rim 16 and are disposed substantially concentric with one another and with the frame 14. The bowl is, therefore, gripped between the arcuate portions 28 by reason of the resilience of the legs 29 and tightly enough to keep the bowl from turning around or coming out. The bowl may, however, be removed quickly and easily when desired, either for the purpose of cleaning the utensil, or when a bowl having a different mesh screen is to be used.

In operation, it will be clear from the foregoing description that the fact that the screen bowl 10 is suspended in elevated relation to the supporting frame enables the use of the utensil on practically any dish, regardless of depth. For example, potatoes may be riced placing the press directly on the dish that is to be used in serving the potatoes at the table. There is no need for using a deeper bowl in connection with the press and then later transferring the food to the dish from which it is to be served. The saving in time and work resulting from the use of this efficient utensil is, therefore, manifest. Moreover, in the use of this utensil the screen bowl is always clear of the foot in the dish, and there is, therefore, no need to clear away food from under the bowl. This means a saving in time, and is regarded as a decided advantage.

I claim:

1. In a strainer having a bowl and a circular supporting rim, a supporting frame adapted to rest on the rim of a suitable receptacle, and a pair of wire holders projecting upwardly from the frame in spaced relation to one another, the upper ends of said holders being bent to arcuate form in a plane parallel to the plane of the supporting frame and together approximating a circle for reception of the rim of said bowl thereon, whereby to suspend the bowl in elevated relation to the supporting frame.

2. In a strainer having a bowl and a circular supporting rim, a supporting frame adapted to rest on the rim of a suitable receptacle, and a pair of wire holders for said bowl projecting upwardly from said supporting frame, the same being each bent to provide complemental arcuate portions in a plane substantially parallel with the plane of the supporting frame at a predetermined elevation above the same for reception of the rim of said bowl therein, and being each further bent to provide downwardly projecting supporting legs rigid at their lower ends with the supporting frame, the said legs serving to support the arcuate portions in a predetermined spaced relation and having sufficient resilience whereby to permit spreading apart of said arcuate portions to receive the bowl therebetween, the said supporting legs by reason of the resilience thereof causing the arcuate portions to grip the bowl under spring tension.

In witness of the foregoing I affix my signature.

CHARLES ANDREWS.